US012516547B1

(12) United States Patent
Xu

(10) Patent No.: US 12,516,547 B1
(45) Date of Patent: Jan. 6, 2026

(54) SIMPLIFIED DOUBLE-SIDED NYLON LOCK

(71) Applicant: Hangzhou Changsen Hardware Products Co., Ltd., Zhejiang (CN)

(72) Inventor: Yong Xu, Hangzhou (CN)

(73) Assignee: Hangzhou Changsen Hardware Products Co., Ltd., Hangzhou (CN)

( * ) Notice: Subject to any disclaimer, the term of this patent is extended or adjusted under 35 U.S.C. 154(b) by 0 days.

(21) Appl. No.: 19/303,527

(22) Filed: Aug. 19, 2025

(51) Int. Cl.
*E05B 63/22* (2006.01)
*E05B 9/02* (2006.01)

(52) U.S. Cl.
CPC ................ *E05B 63/22* (2013.01); *E05B 9/02* (2013.01)

(58) Field of Classification Search
CPC . E05C 3/08; E05C 3/162; E05C 3/167; E05C 1/14; E05C 1/145; Y10T 292/0995; Y10T 292/0976; Y10T 292/106; Y10S 292/29
See application file for complete search history.

(56) References Cited

U.S. PATENT DOCUMENTS 448,298 A * 3/1891 Lecellier ................. E05B 83/16 70/141
990,541 A * 4/1911 Gates ....................... E05B 55/00 70/216
1,207,123 A * 12/1916 Arsneau .................. E05B 85/22 70/482
1,843,143 A * 2/1932 Rymer .................. E05B 55/005 70/DIG. 73
3,136,571 A * 6/1964 Johnson .................... E05C 1/14 292/173
3,490,803 A * 1/1970 Rollins ..................... E05C 1/14 292/170
3,955,839 A * 5/1976 Praska .................... E05C 3/162 292/226
5,129,691 A * 7/1992 McFarlen ................. E05C 3/30 292/214
5,157,953 A * 10/1992 Hung ...................... E05B 63/22 70/216
2011/0289987 A1* 12/2011 Chiou ....................... E05C 1/14 70/91
2013/0328331 A1* 12/2013 Wollacott ................ E05C 3/006 292/202
2016/0083976 A1* 3/2016 Rickenbaugh ............ E05C 9/12 292/336.3
2019/0112848 A1* 4/2019 Carter ....................... E05C 3/40

FOREIGN PATENT DOCUMENTS

DE 4014970 A1 * 11/1991 ............... E05C 1/14
GB 2513883 A * 11/2014 ............... E05C 3/08
WO WO-9958797 A1 * 11/1999 ............. E05B 63/22

* cited by examiner

*Primary Examiner* — Suzanne L Barrett
(74) *Attorney, Agent, or Firm* — Nicholas Makridakis

(57) ABSTRACT

Disclosed in the invention is a simplified double-sided nylon lock. A double-sided lock body includes a first lock body, which is mounted on a side of a door and is unlocked by pressing to open the door, a second lock body, which is mounted on the other side of the door and is unlocked by pulling-out to open the door, and a linkage, which penetrates the door, with one end thereof being connected to the first lock body and the other end thereof being connected to the second lock body. By virtue of the invention, a first lock body and a second lock body are provided, so as to implement different unlocking and door opening methods on two sides of a door.

10 Claims, 13 Drawing Sheets

SIMPLIFIED DOUBLE-SIDED NYLON LOCK

TECHNICAL FIELD

The present invention relates to the technical field of locksets, and in particular to a simplified double-sided nylon lock.

BACKGROUND

During the use of traditional locksets, when a lock has been unlocked, it is necessary to additionally apply a pushing force or a pulling force to open a door, bringing about the problems of operations being relatively complicated, the unlocking being inconvenient, etc. Moreover, some locksets only support single-sided unlocking, and in some special usage scenarios, a user has to go around to the other side of the door to perform an unlocking operation, which is very inconvenient. Furthermore, some of the existing locksets have a complex structure with a lot of parts, such that the production cost is increased, and the locksets are also prone to a fault which is difficult to repair. When the door is unexpectedly touched, the locksets may lock themself, which causes inconvenience. In this regard, provided is a simplified double-sided nylon lock.

SUMMARY

The objective of the present invention is to provide a simplified double-sided nylon lock to solve the problem.

To achieve the objective above, the following technical solution is provided: a simplified double-sided nylon lock comprising a double-sided lock body, which is mounted on a door, and a toggling member, which is mounted on a door frame and engaged with the double-sided lock body, wherein the double-sided lock body comprises a first lock body, which is mounted on a side of the door and is unlocked by means of pressing to open the door, a second lock body, which is mounted on the other side of the door and is unlocked by means of pulling-out to open the door, and a linkage, which penetrates the door, with one end thereof being connected to the first lock body and the other end thereof being connected to the second lock body; and each of the first lock body and the second lock body is provided with a mounting seat, which is detachably connected to the door, a cylinder plug seat, which is movably connected to the first lock body and the second lock body, a cylinder plug, which is connected to the cylinder plug seat, a transmission rod, one end of which is connected to the cylinder plug and the other end of which is connected to the linkage, and a spring, which is sheathed at the transmission rod to allow the movement of the cylinder plug seat.

Preferably, the first lock body further comprises a first case, which is connected to the mounting seat, a sliding slot, which is provided on the first case, a fixed slider, which passes through the transmission rod to be connected to the cylinder plug seat and is also slidably connected to the sliding slot, and a cover plate, one end of which is connected to the first case and the other end of which is connected to the spring to allow the transmission rod to pass through. Preferably, a mounting column for fixing the cover plate is arranged on the first case.

Preferably, the second lock body comprises a second case, which is connected to the mounting seat, a retaining slot, which is provided on the second case, a strike, which is connected to the retaining slot, a driving plate, which is mounted within the second case, passes through the transmission rod to be connected to the cylinder plug seat, and can drive the movement of the strike by means of compressing the spring, a baffle plate, which is arranged on the second case, can pass through the cylinder plug to be connected to the spring at an end, and is connected to the cylinder plug seat at the other end, a circlip, which is connected to the transmission rod and located above the driving plate, and a limiting ring, which is connected to the transmission rod and located below the driving plate for limiting the rotation of a latch hook.

Preferably, a limiting slot 1 for limiting the rotation of the latch hook is provided on the limiting ring in a circumferential direction.

Preferably, the strike comprises a notched block, which fits the retaining slot, a rotation shaft, which is arranged on the notched block, and a latch hook, which is arranged on the rotation shaft.

Preferably, a limiting rod is arranged at an end of the latch hook.

Preferably, an end of the transmission rod is provided with a first slot, which fits the cylinder plug, and the other end thereof is provided with a second slot, which fits the linkage.

Preferably, the first case and the second case are each provided with a guide slot, which is connected to the mounting seat, and a mounting hole, which is used for the fixation to the mounting seat.

Preferably, the toggling member is provided with a fixing seat, which is connected to the door frame, and a latch bolt, which is connected to the latch hook.

Preferably, both the mounting seat and the fixing seat are also provided with several mounting holes for connecting to the door, the first case and the second case.

The beneficial effects of the present invention are: a first lock body and a second lock body are provided, so as to implement different unlocking and door opening methods on two sides of a door, i.e., unlocking by means of pressing on a side and unlocking by means of pulling-out on the other side, thereby greatly improving the usage convenience; moreover, the door can be directly opened by means of a pulling-out force or a pressing force, such that the unlocking and door opening are realized using the same force, and the operation is simple. A linkage is provided, with one end of the linkage being connected to the first lock body, and the other end thereof being connected to the second lock body, so as to construct a bridge between the lock bodies on the two sides of the door. When the lock is unlocked by means of pressing on the side where the first lock body is mounted or the lock is unlocked by means of pulling-out on the side where the second lock body is mounted, the linkage can accurately transfer an actuation force between the lock bodies on the two sides in a timely manner, such that the first lock body and the second lock body operate synchronously, thereby implementing the function of unlocking and opening the door on both sides of the door. This double-sided linkage design overcomes the single-sided operation limitation of traditional door locks, thereby meeting requirements for convenient access from both sides of the door in different scenarios, and greatly improving the usage convenience for a user. Moreover, a transmission structure of a double-sided lock body is also simplified, so as to facilitate the mounting of a door lock, reduce the complexity and cost of the structure, and facilitate maintenance, thereby improving the economy and applicability of a product. A mounting seat is provided, so as to facilitate the connection of the first lock body and the second lock body to the door. It is possible to first connect the mounting seat to the door, and it is also possible to first connect the mounting seat to the first lock body or the second lock body and then to the door.

A circlip is provided for fixing a mounting position of a transmission rod, which is fixed to a driving plate. The driving plate is provided, which can pass through the transmission rod to be connected to a cylinder plug seat, and can accurately receive the actuation force transferred from the cylinder plug seat through the transmission rod during unlocking. Either pressing the cylinder plug seat on the side of the first lock body or pulling out the cylinder plug seat on the side of the second lock body, the driving plate can efficiently and stably transfer the actuation force to the latch hook, so as to push the latch hook to move, thereby implementing the function of unlocking from both sides of the door. Moreover, this efficient actuation force transfer mechanism ensures the smooth linkage of the double-sided lock body, enabling a user to easily unlock the door from any side of the door, and thus greatly improving the usage convenience for the user. A limiting slot is provided on a limiting ring, a limiting rod is provided on the latch hook, such that after a cylinder plug is rotated to drive the rotation of the transmission rod and the limiting ring and the limiting rod enters the limiting slot, the lock bodies cannot be unlocked by means of pulling-out or pressing, thereby ensuring safety.

Reference signs: 1. double-sided lock body; 11. first lock body; 111. first case; 1111. mounting column; 112. sliding slot; 113. fixed slider; 114. cover plate; 12. second lock body; 121. second case; 1211. retaining slot; 122. strike; 1221. notched block; 1222. rotation shaft; 1223. latch hook; 1224. limiting rod; 123. driving plate; 124. baffle plate; 125. circlip; 126. limiting ring; 1261. limiting slot; 13. linkage; 14. mounting seat; 15. cylinder plug seat; 16. cylinder plug; 17. transmission rod; 171. first slot; 172. second slot; 18. spring; 19. guide slot; 20. mounting hole; 2. toggling member; 21. fixing seat; and 22. latch bolt.

DETAILED DESCRIPTION

The simplified double-sided nylon lock according to the present invention will be further described below with reference to the accompanying drawings.

It should be noted that all directional indications, such as up, down, left, right, front, and back, in the embodiments of the present invention are only intended to explain a relative positional relationship, a movement status and the like between components in a specific posture (as shown in the figures). If the specific posture changes, the directional indications change accordingly.

In the present invention, unless otherwise expressly stated or defined, the terms such as “connection” and “fixing” should be interpreted broadly, for example, “fixing” may be a fixed or detachable connection, or integration; may be a mechanical connection or an electrical connection; or may be a direct connection or an indirect connection by means of an intermediate medium, and may be communication between the interiors of two elements or the interaction relationship of the two elements, unless otherwise expressly defined. For those of ordinary skill in the art, the specific meaning of the terms mentioned above in the present invention should be construed according to specific circumstances.

Figure 1:
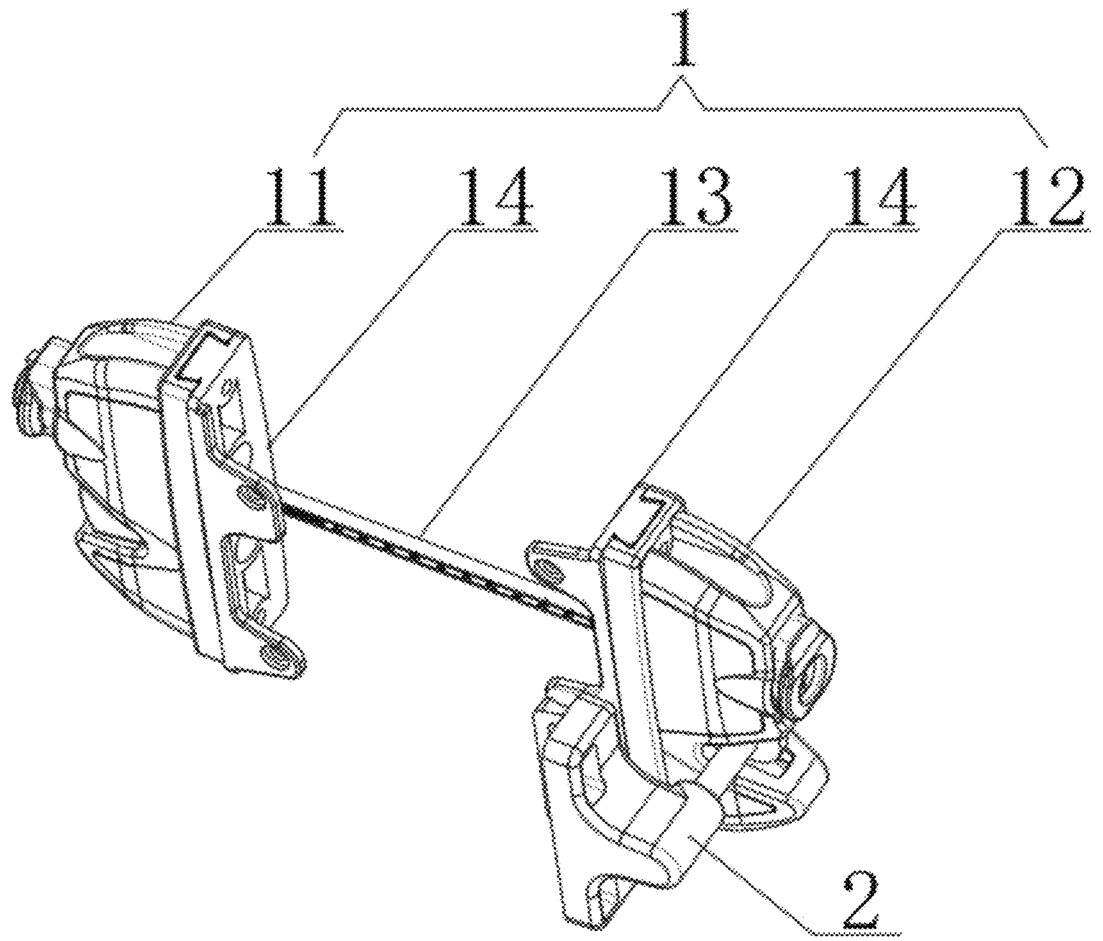
FIG. 1 is a schematic diagram of an overall structure in the present invention.
Figure 2:
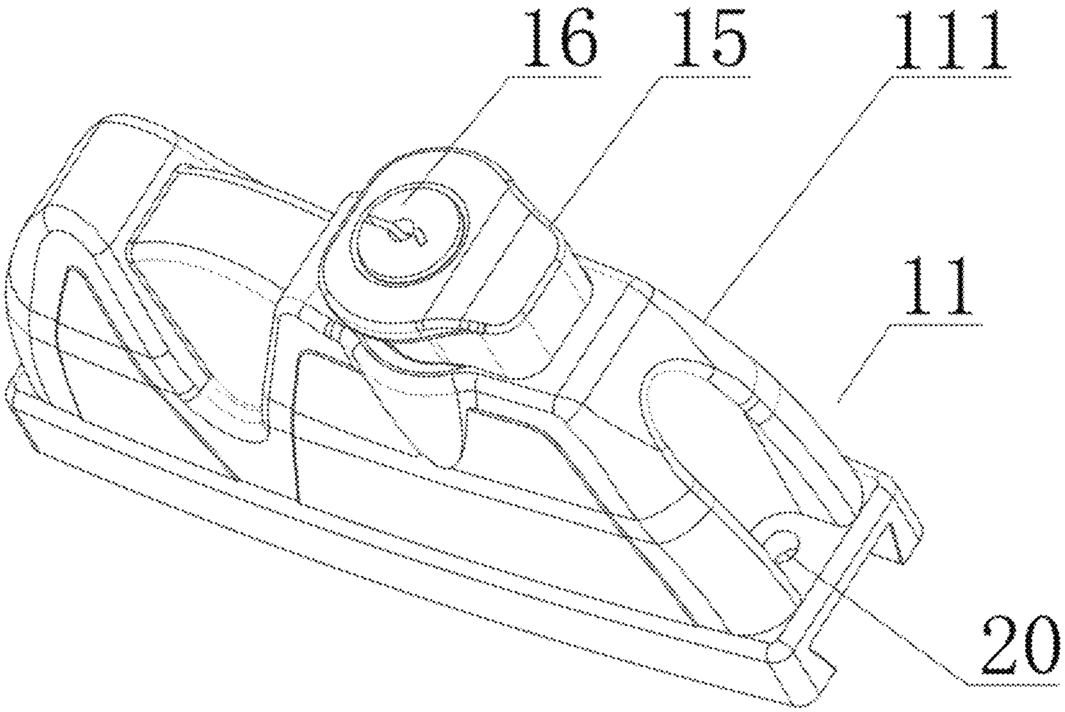
FIG. 2 is a schematic structural diagram of a first lock body in the present invention.
Figure 3:
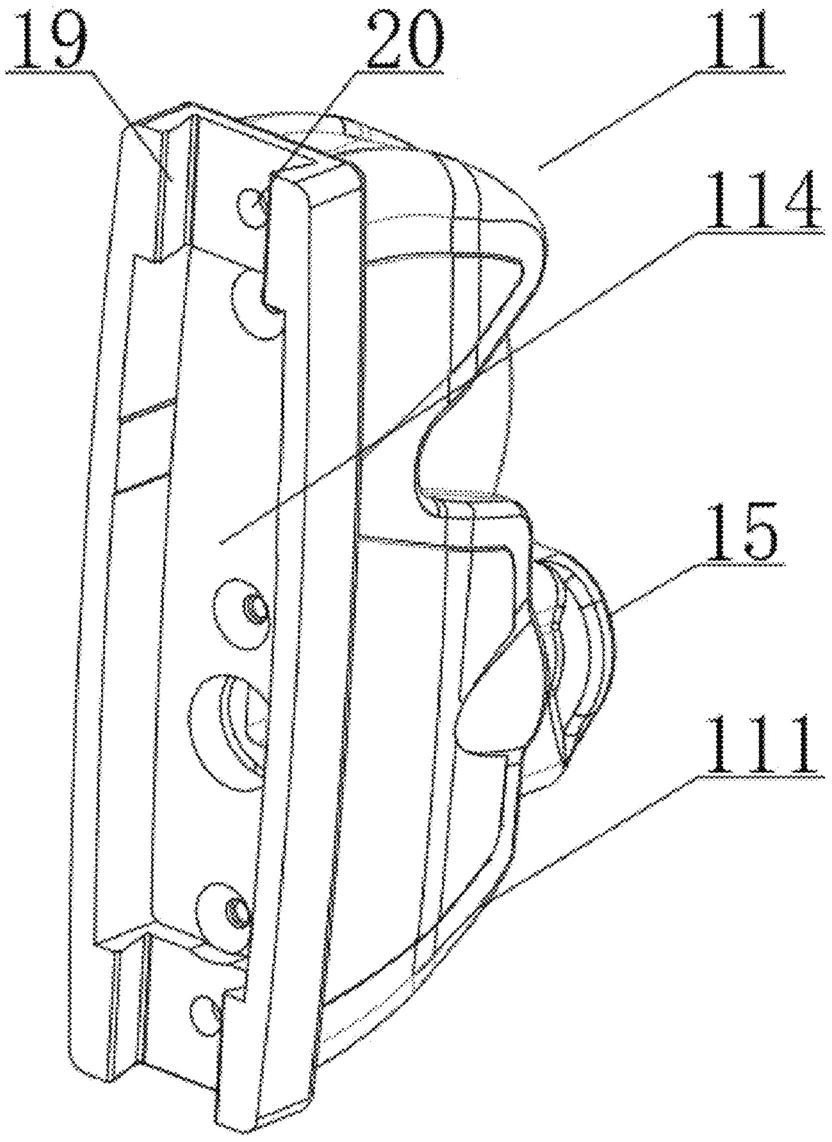
FIG. 3 is a schematic structural diagram of the first lock body in the present invention from another perspective.
Figure 4:
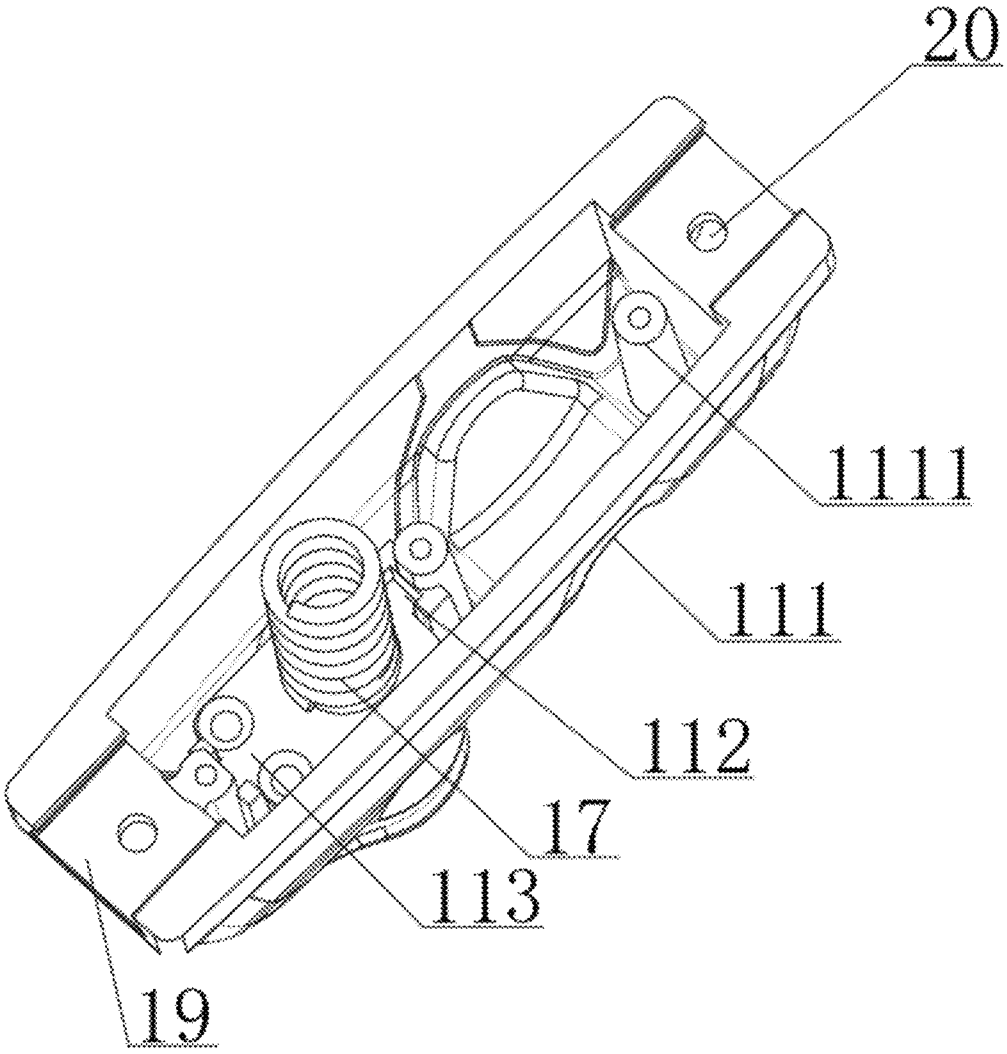
FIG. 4 is a process diagram of assembly 1 of the first lock body in the present invention.
Figure 5:
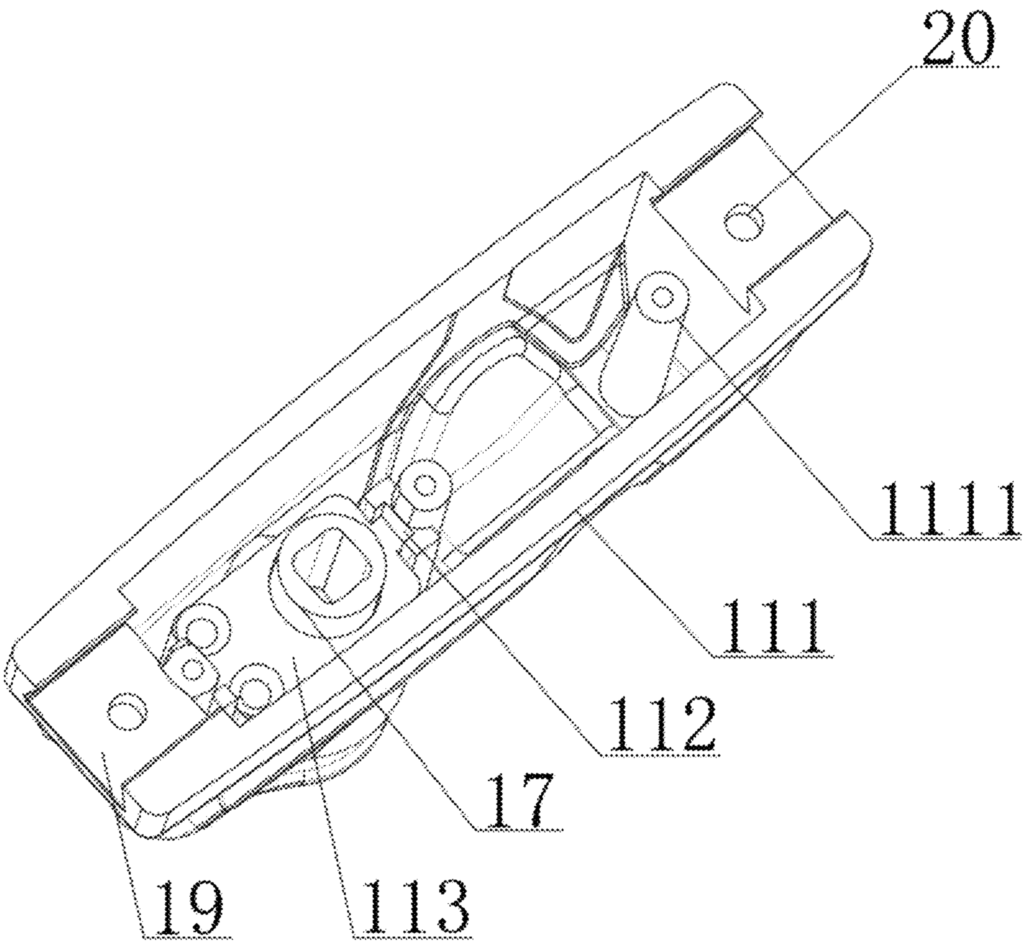
FIG. 5 is a process diagram of assembly 2 of the first lock body in the present invention.
Figure 6:
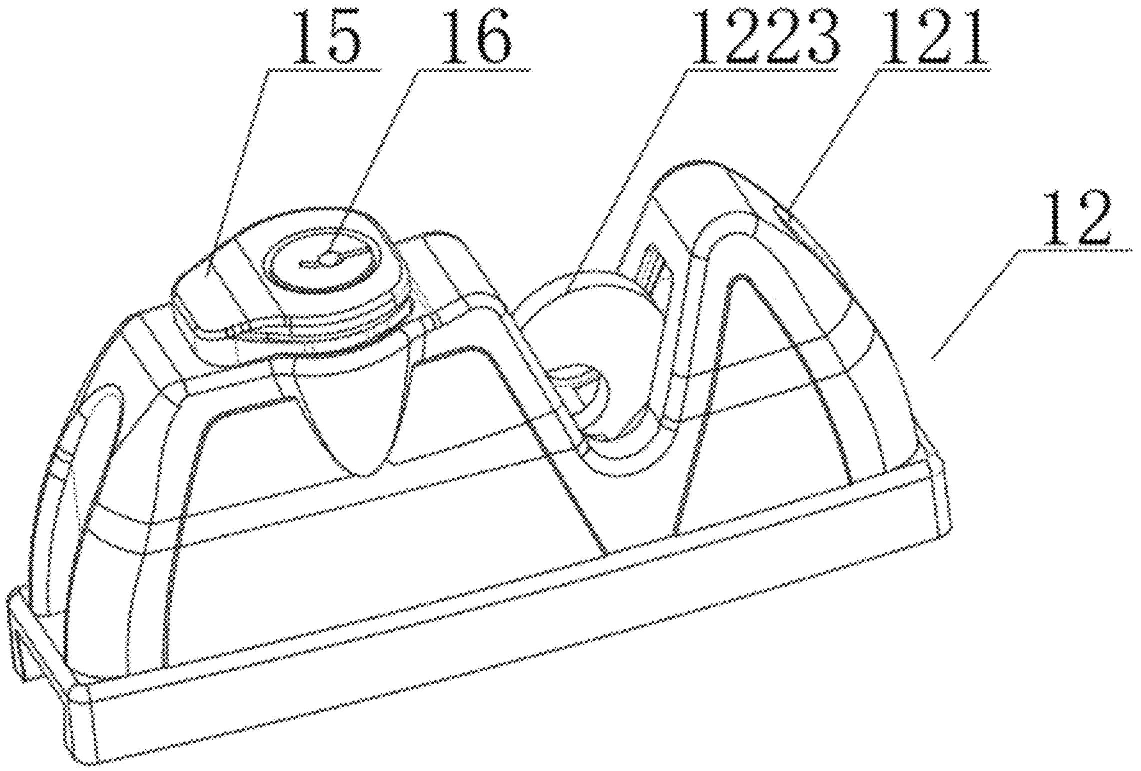
FIG. 6 is a schematic structural diagram of a second lock body in the present invention.
Figure 7:
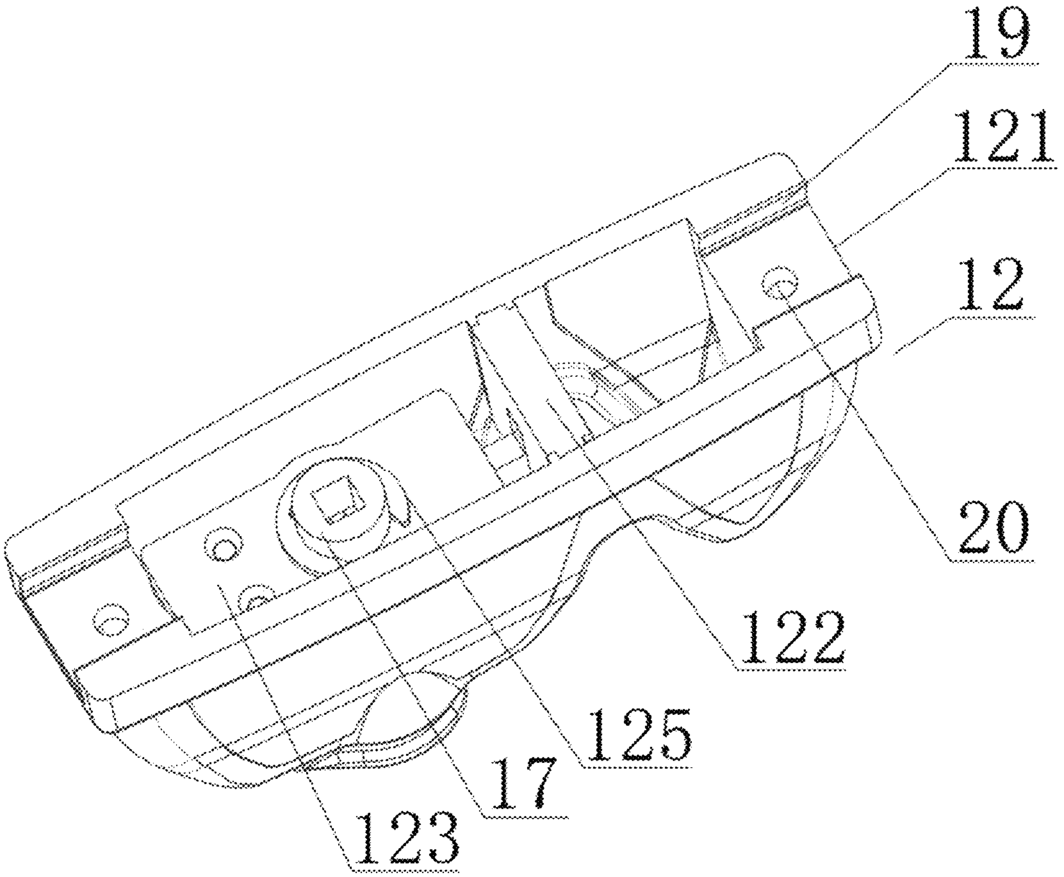
FIG. 7 is a schematic structural diagram of the second lock body in the present invention from another perspective.
Figure 8:
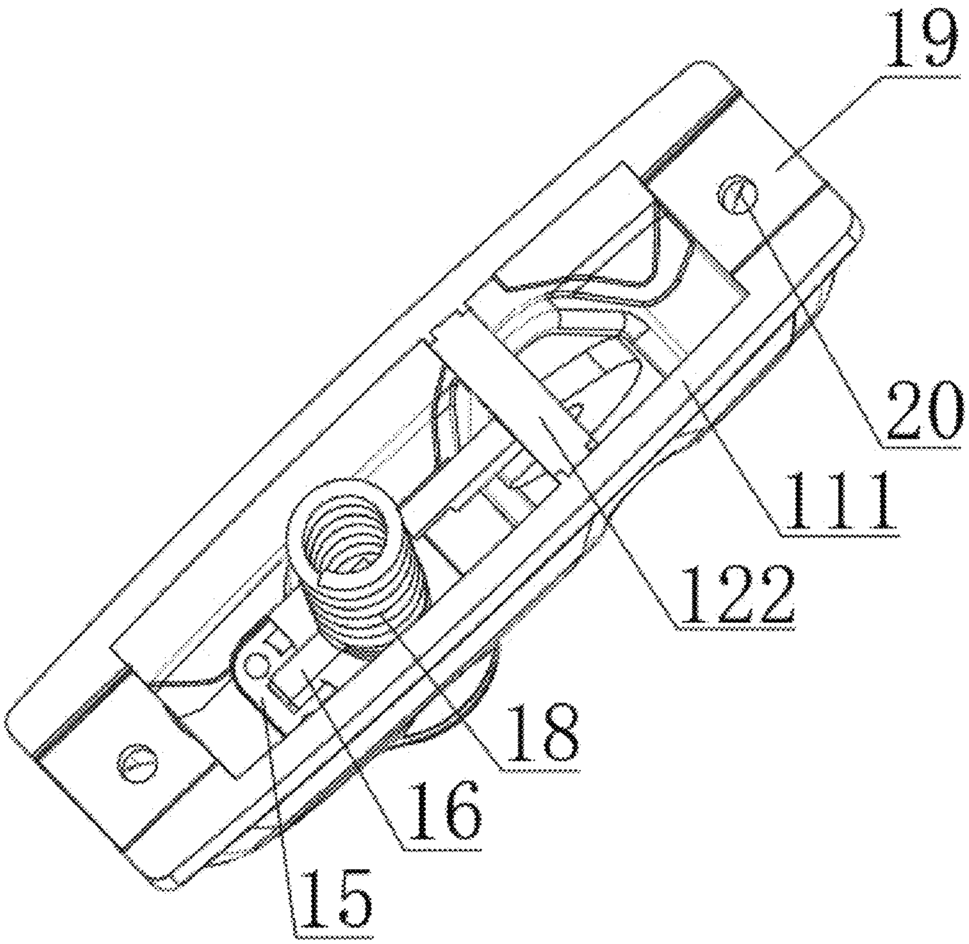
FIG. 8 is a process diagram of assembly of the second lock body in the present invention.
Figure 9:
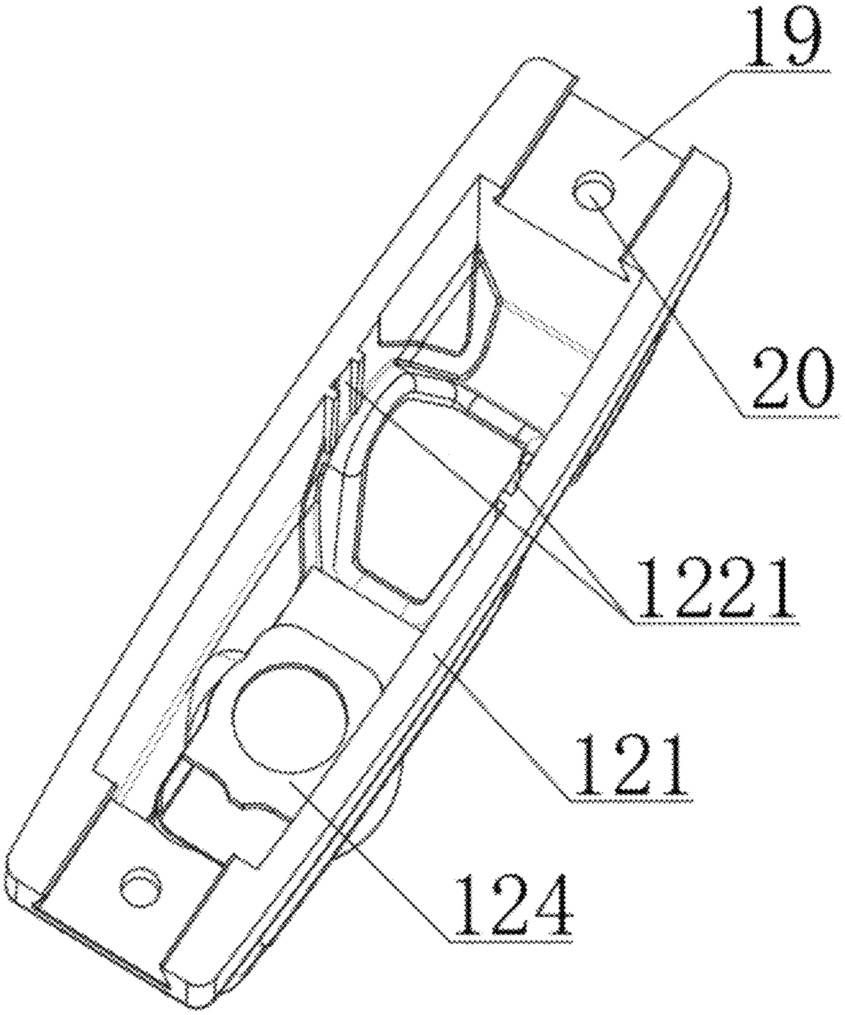
FIG. 9 is a schematic structural diagram of a second case in the present invention.
Figure 10:
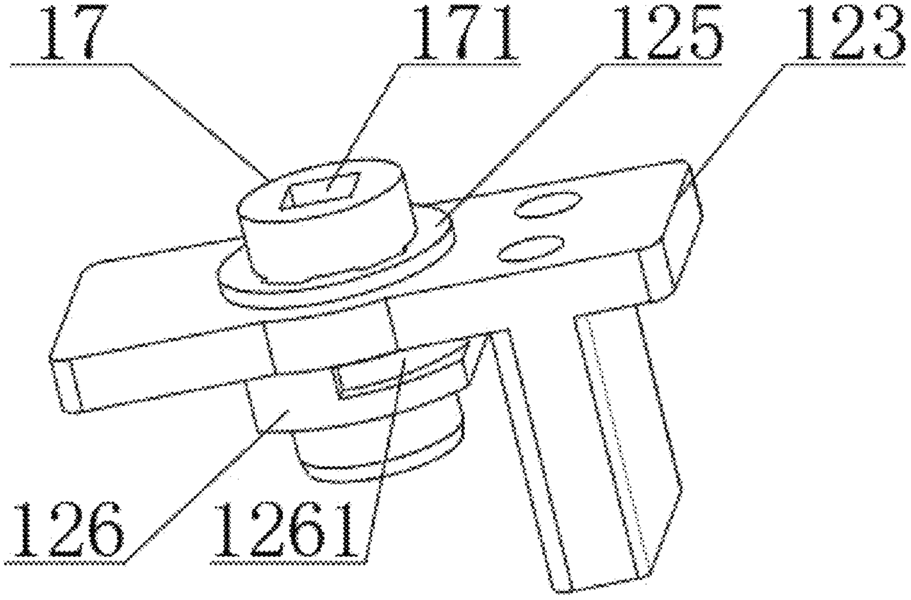
FIG. 10 is a process diagram of assembly 1 of the second lock body in the present invention.
Figure 11:
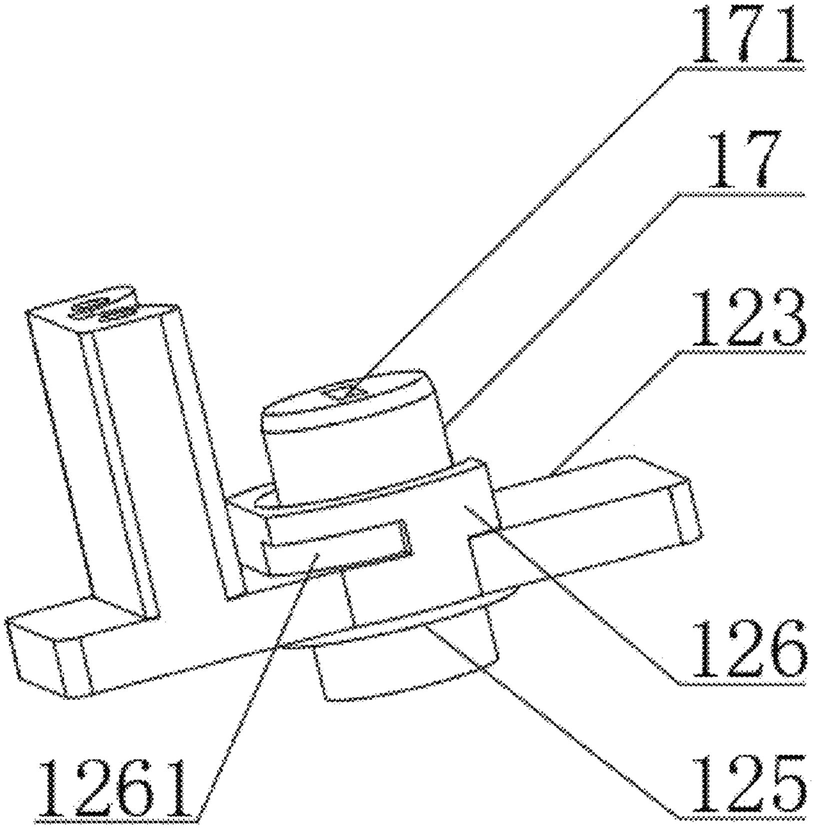
FIG. 11 is a schematic structural diagram of a driving plate in the present invention.
Figure 12:
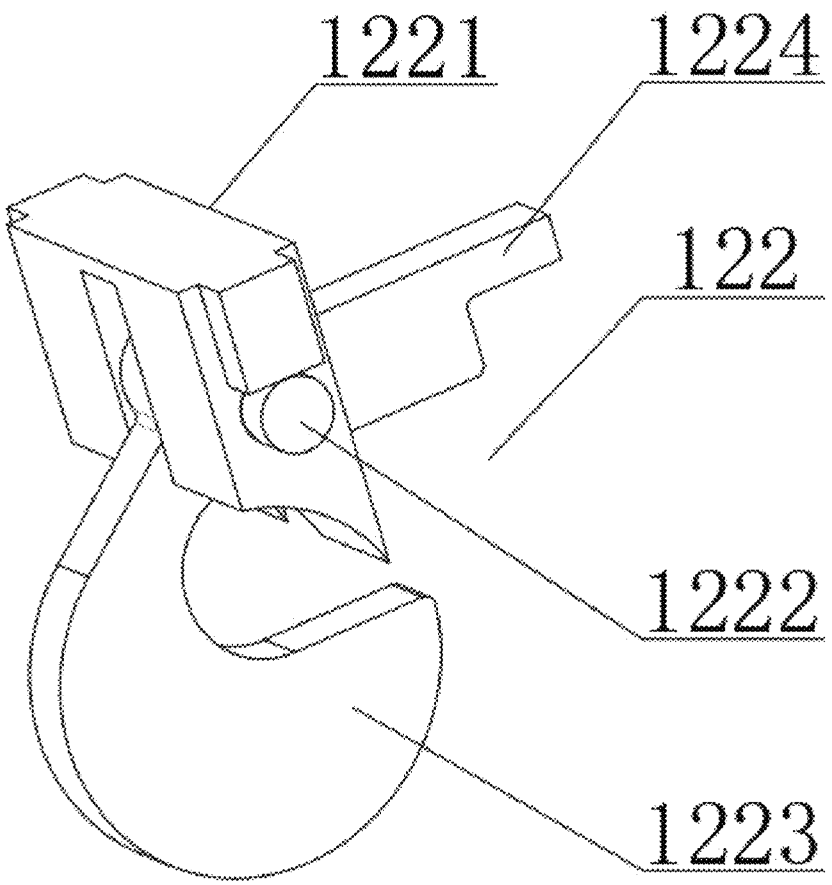
FIG. 12 is a schematic structural diagram of the driving plate in the present invention from another perspective.
Figure 13:
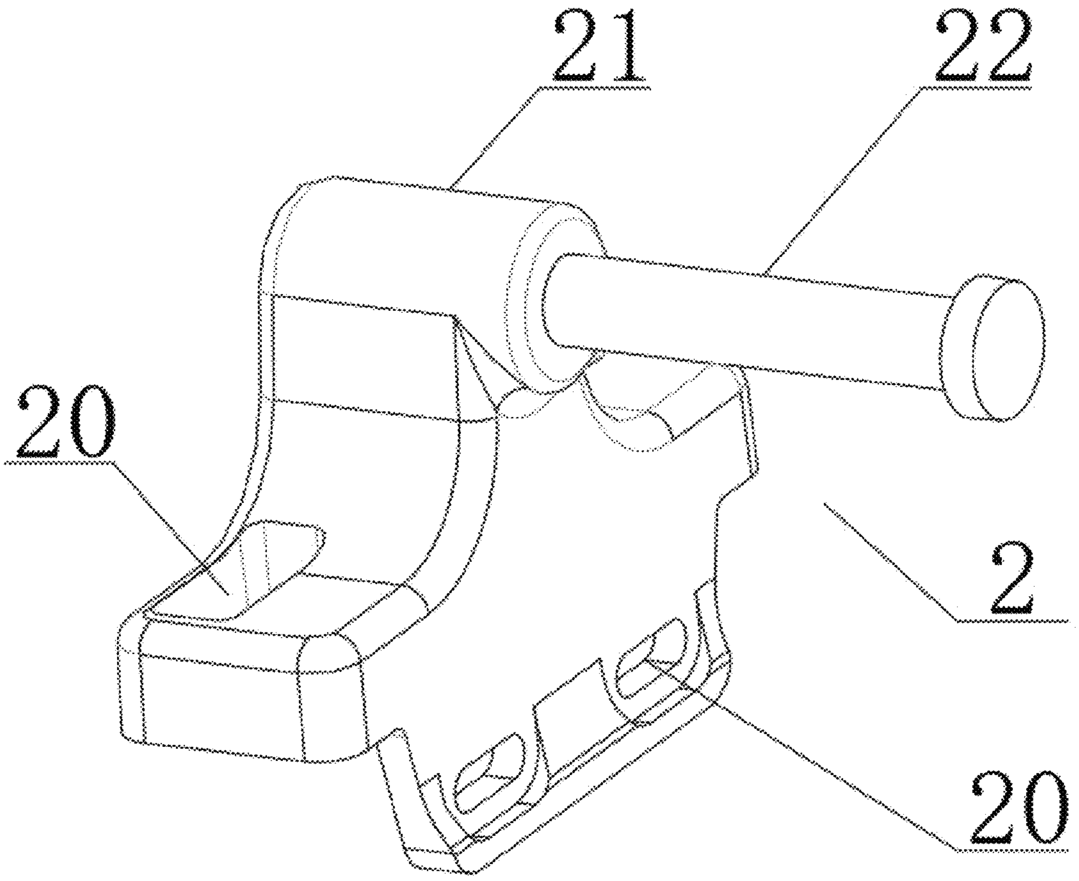
FIG. 13 is a schematic structural diagram of a strike in the present invention.
Figure 14:
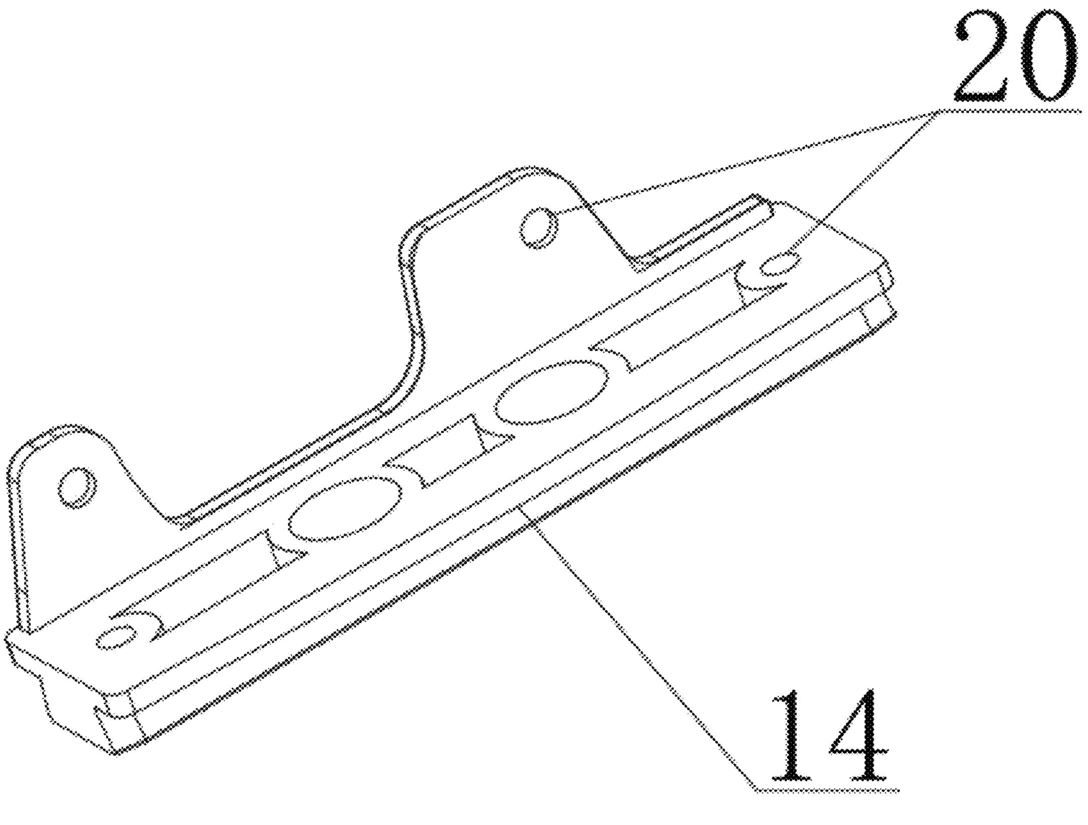
FIG. 14 is a schematic structural diagram of a mounting seat in the present invention.

As shown in FIGS. 1-14, a simplified double-sided nylon lock in the present embodiment includes a double-sided lock body 1, which is mounted on a door, and a toggling member 2, which is mounted on a door frame and engaged with the double-sided lock body 1. The double-sided lock body 1 includes a first lock body 11, which is mounted on a side of the door and is unlocked by means of pressing to open the door, a second lock body 12, which is mounted on the other side of the door and is unlocked by means of pulling-out to open the door, and a linkage 13, which penetrates the door, with one end thereof being connected to the first lock body 11 and the other end thereof being connected to the second lock body 12. Each of the first lock body 11 and the second lock body 12 is provided with a mounting seat 14, which is detachably connected to the door, a cylinder plug seat 15, which is movably connected to the first lock body 11 and the second lock body 12, a cylinder plug 16, which is connected to the cylinder plug seat 15, a transmission rod 17, one end of which is connected to the cylinder plug 16 and the other end of which is connected to the linkage 13, and a spring 18, which is sheathed at the transmission rod 17 to allow the movement of the cylinder plug seat 15. A first lock body 11 and a second lock body 12 are provided, so as to implement different unlocking and door opening methods on two sides of a door, i.e., unlocking by means of pressing on a side and unlocking by means of pulling-out on the other side, thereby greatly improving the usage convenience; moreover, the unlocked door can be directly opened by means of a pulling-out force or a pressing force, such that the unlocking and door opening are realized using the same force, and the operation is simple. A linkage 13 is provided, with one end of the linkage 13 being connected to the first lock body 11, and the other end thereof being connected to the second lock body 12, so as to construct a bridge between the lock bodies on the two sides of the door. When the lock is unlocked by means of pressing on the side where the first lock body 11 is mounted or the lock is unlocked by means of pulling-out on the side where the second lock body 12 is mounted, the linkage 13 can accurately transfer an actuation force between the lock bodies on the two sides in a timely manner, such that the first lock body 11 and the second lock body 12 operate synchronously, thereby implementing the function of unlocking and opening the door on both sides of the door. This double-sided linkage design overcomes the single-sided operation limitation of traditional door locks, thereby meeting requirements for convenient access from both sides of the door in different scenarios, and greatly improving the usage convenience for a user. Moreover, a transmission structure of a double-sided lock body 1 is also simplified, so as to facilitate the mounting of a door lock, reduce the complexity and cost of the structure, and facilitate maintenance, thereby improving the economy and applicability of a product. A mounting seat 14 is provided, so as to facilitate the connection of the first lock body 11 and the second lock body 12 to the door. It is possible to first connect the mounting seat 14 to the door, and it is also possible to first connect the mounting seat 14 to the first lock body 11 or the second lock body 12 and then to the door.

In an embodiment, the first lock body 11 further includes a first case 111, which is connected to the mounting seat 14, a sliding slot 112, which is provided on the first case 111, a fixed slider 113, which passes through the transmission rod 17 to be connected to the cylinder plug seat 15 and is also slidably connected to the sliding slot 112, and a cover plate 114, one end of which is connected to the first case 111 and the other end of which is connected to the spring 18 to allow the transmission rod 17 to pass through. A mounting column 1111 for fixing the cover plate 114 is arranged on the first case 111. An end of the spring 18 is connected to the fixed slider 113 and sheathed on the transmission 17 on the fixed slider 113, and the other end thereof is connected to the cover plate 114. When pressure is applied to the cylinder plug seat 15 on the first lock body 11, the cylinder plug seat 15, together with the cylinder plug 16 and the fixed slider 113, pushes the transmission rod 17 to move along the sliding slot 112, the fixed slider 113 squeezes the spring 18 towards the direction of the cover plate 114, and the transmission rod 17 drives the linkage 13 to move towards the direction of the second lock body 12.

In an embodiment, the second lock body 12 includes a second case 121, which is connected to the mounting seat 14, a retaining slot 1211, which is provided on the second case 121, a strike 122, which is connected to the retaining slot 1211, a driving plate 123, which is mounted within the second case 121, passes through the transmission rod 17 to be connected to the cylinder plug seat 15, and can drive the movement of the strike 122 by means of compressing the spring 18, a baffle plate 124, which is arranged on the second case 121, can pass through the cylinder plug 16 to be connected to the spring 18 at an end, and is connected to the cylinder plug seat 16 at the other end, a circlip 125, which is connected to the transmission rod 17 and located above the driving plate 123, and a limiting ring 126, which is connected to the transmission rod 17 and located below the driving plate 123 for limiting the rotation of a latch hook 1223. A limiting slot 1261 for limiting the rotation of the latch hook 1223 is provided on the limiting ring 126 in a circumferential direction. The strike 122 includes a notched block 1221, which fits the retaining slot 1211, a rotation shaft 1222, which is arranged on the notched block 1221, and a latch hook 1223, which is arranged on the rotation shaft 1222. A limiting rod 1224 is arranged at an end of the latch hook 1223. An end of the spring 18 is connected to the baffle plate 124 and sheathed on the cylinder plug 16, and the other end thereof is sheathed outside the transmission rod 17 and connected to the limiting ring 126. When a key is used to rotate the cylinder plug 16 on the second lock body 12, such that the cylinder plug 16 on the second lock body 12 drives the transmission rod 17 on the second lock body 12 to rotate, or when a key is used to rotate the cylinder plug 16 on the first lock body 11, the cylinder plug 16 on the first lock body 11 drives the transmission rod 17 on the first lock body 11 and the linkage 13 to rotate, the linkage 13 drives the transmission rod 17 on the second lock body 12 to rotate, and the transmission rod 17 drives the limiting ring 126 to rotate. When the limiting slot 1261 on the limiting ring 126 is separated from the limiting rod 1224 on the latch hook 1223, the cylinder plug seat 15 is pulled out, the cylinder plug seat 15, together with the cylinder plug 16 and the driving plate 123 connected to the cylinder plug seat 15, moves outwards, and the driving plate 123 drives the transmission rod 17 and the limiting ring 126 to squeeze the spring 18. When moving outwards, the driving plate 123 presses the latch hook 1223 downwards, such that the latch hook 1223 is rotated around the rotation shaft 1222 on the notched block 1221. When the driving plate 123 presses to the lowest position, the latch hook 1223 is rotated into the second lock body 12, so as to unlock, and at the same time, the unlocked door can be directly pulled open by means of the pulling-out force. When a key is used to rotate the cylinder plug 16 on the first lock body 11 or the second lock body 12, the cylinder plug 16 drives the transmission rod 17 to rotate, and the transmission rod 17 drives the limiting ring 126 to rotate, such that the limiting rod 1224 on the latch hook 1223 is rotated into the limiting slot 1261 on the limiting ring 126. Afterwards, when the first lock body 11 is pressed or the second lock body 12 is pulled out, the driving plate 123 and the limiting ring 126 press the latch hook 1223 downwards, enabling the latch hook 1223, together with the notched block 1221, to slide to the bottom of the retaining slot 1211 along the retaining slot 1211, such that the latch hook 1223 cannot be rotated to unlock. The circlip 125 is provided for fixing a mounting position of the transmission rod 17, which is fixed to the driving plate 123. The driving plate 123 is provided, which can pass through the transmission rod 17 to be connected to the cylinder plug seat 15, and can accurately receive the actuation force transferred from the cylinder plug seat 15 during unlocking. Either pressing the cylinder plug seat 15 on the side of the first lock body 11 or pulling out the cylinder plug seat 15 on the side of the second lock body 12, the driving plate 123 can efficiently and stably transfer the actuation force to the latch hook 1223, so as to push the latch hook 1223 to move, thereby implementing the function of unlocking from both sides of the door. Moreover, this efficient actuation force transfer mechanism ensures the smooth linkage of the double-sided lock body 1, enabling a user to easily unlock the door from any side of the door, and thus greatly improving the usage convenience for the user. The limiting slot 1261 is provided on a limiting ring 126, and the limiting rod 1224 is provided on the latch hook 1223, such that after the cylinder plug 16 is rotated to drive the rotation of the transmission rod 17 and the limiting ring 1261 and the limiting rod 1224 enters the limiting slot 1261, the lock bodies cannot be unlocked by means of pulling-out or pressing, thereby improving the safety of the lock bodies.

In an embodiment, an end of the transmission rod 17 is provided with a first slot 171, which fits the cylinder plug 16, and the other end thereof is provided with a second slot 172, which fits the linkage 13. The first slot 171 fits a transmission component on the cylinder plug 16. When the cylinder plug 16 is rotated, the transmission rod 17 is rotated along with same, and drives the linkage 13 to rotate. The second slot 172 needs to fit the transmission rod 17 to precisely transfer a force, so as to realize unlocking.

In an embodiment, the first case 111 and the second case 121 are each provided with a guide slot 19, which is connected to the mounting seat 14, and a mounting hole 20, which is used for the fixation to the mounting seat 14. The mounting seat 14 is slidably connected to the first case 111 and the second case 121 along the guide slot 19.

In an embodiment, the toggling member 2 is provided with a fixing seat 21, which is connected to a door frame, and a latch bolt 22, which is connected to the latch hook 1223. When the lock is unlocked, the latch hook 1223 is separated from the latch bolt 22; and when the door is locked, the latch hook 1223 is hooked to the latch bolt 22.

In an embodiment, both the mounting seat 14 and the fixing seat 21 are also provided with several mounting holes 20 for connecting to the door, the first case 111 and the second case 121. The mounting seat 14 is connected to the two sides of the door by means of screws, and the fixing seat 21 is connected to the door frame by means of screws.

For the use of the present invention, the first lock body 11 is mounted. The cylinder plug 16 is first mounted to the cylinder plug seat 15, and the cylinder plug seat 15, to which the cylinder plug 16 has been mounted, is mounted to the first case 111. Then, the first slot 171 on the transmission rod 17 is connected to the cylinder plug 16, the fixed slider 113 passes through the transmission rod 17 and is connected to the cylinder plug seat 15 by means of screws, and the fixed slider 113 is retained into the sliding slot 112 on the first case 111. Afterwards, the spring 18 is sheathed on the transmission rod 17, through which the fixed slider 113 has passed, with an end of the spring 18 being connected to the fixed slider 113. A screw is then used to connect the cover plate 114 to the mounting column 1111 on the first case 111, with the other end of the spring 18 abutting against the cover plate 114. When the cylinder plug seat 15 is pressed, the transmission rod 17 can pass through the cover plate 114, the mounting seat 14 is connected to the first case 111 by means of the guide slot 19 on the first case 111, and the first case 111 is then fixedly connected to the mounting seat 14 by means of a bolt.

The second lock body 12 is mounted. The cylinder plug 16 is first mounted to the cylinder plug seat 15, and the cylinder plug seat 15, to which the cylinder plug 16 has been mounted, is mounted to the first case 111 and connected to the baffle plate 124, where the cylinder plug 16 can pass through the baffle plate 124. Then, an end of the latch hook 1223 that has a hole is retained into a notch of the notched block 1221, the latch hook 1223 is fixed to the notched block 1221 by means of inserting the rotation shaft 1222 into the notched block 1221, and the mounted strike 122 is retained into the retaining slot 1211. Afterwards, the transmission rod 17 passes through the driving plate 123, the transmission rod 17 is fixed above the driving plate 123 using the circlip 125, and the limiting ring 126 is fixed to the transmission rod 17 below the driving plate 123. The spring 18 is then sheathed on the cylinder plug 16, with an end of the spring being connected to the baffle plate 124. Next, the driving plate 123, to which the transmission rod 17 has been mounted, is connected to the cylinder plug seat 15 by means of a screw, and the other end of the spring 18 is sheathed on the transmission rod 17 and connected to the limiting ring 126. The mounting seat 14 is connected to the second case 121 by means of the guide slot 19 on the second case 121, and the second case 121 is then fixedly connected to the mounting seat 14 by means of a bolt.

The assembled first lock body 11 fixes the mounting seat 14 to a side of the door by means of a bolt, and the linkage 13 then passes through the door from a side of the door to be connected to the second slot 172 of the transmission rod 17 on the first lock body 11. Afterwards, the second slot 172 of the transmission rod 17 on the assembled second lock body 12 is connected to the other end of the linkage 13. After the connection is completed, a bolt is used to fix the second lock body 12 to the other side of the door, and the fixing seat 21 of the toggling member 2 is connected to the door frame by means of a bolt. When the connection is achieved, the latch bolt 22 is perpendicularly aligned with the position of the latch hook 1223 on the second lock body 12.

For unlocking, when a key is used to rotate the cylinder plug 16 on the second lock body 12, such that the cylinder plug 16 on the second lock body 12 drives the transmission rod 17 on the second lock body 12 to rotate, or when a key is used to rotate the cylinder plug 16 on the first lock body 11, the cylinder plug 16 on the first lock body 11 drives the transmission rod 17 on the first lock body 11 and the linkage 13 to rotate, the linkage 13 drives the transmission rod 17 on the second lock body 12 to rotate, and the transmission rod 17 drives the limiting ring 126 to rotate. When the limiting slot 1261 on the limiting ring 126 is separated from the limiting rod 1224 on the latch hook 1223, the cylinder plug seat 15 on the first lock body 11 can be pressed, such that the cylinder plug seat 15 and the cylinder plug 16 drives the fixed slider 113 to squeeze the spring 18 along the sliding slot 112 towards the direction of the door, and the transmission rod 17 also drives the linkage 13 to push towards the other side of the door. The linkage 13 pushes the transmission rod 17 on the second lock body 12 to move, such that the transmission rod 17, together with the driving plate 123, squeezes the spring 18, and the driving plate 123 moves towards the direction of the cylinder plug seat 15 of the second lock body 12, and drives the the cylinder plug seat 15 and the cylinder plug 16 to move. During movement, the driving plate 123 presses the limiting rod 1224 on the latch hook 1223 to rotate around the rotation shaft 1222, so as to rotate the latch hook 1222 into the second case 121 to realize unlocking, and at the same time, the unlocked door can be directly pushed open by the pressing force.

The cylinder plug seat 15 on the second lock body 12 can also be directly pulled out, such that the cylinder plug seat 15 drives the driving plate 123 to move, and the driving plate 123 drives the transmission rod 17 and the limiting ring 126 to squeeze the spring 18. When moving outwards, the driving plate 123 presses the limiting rod 1224 on the latch hook 1223 to rotate around the rotation shaft 1222, so as to rotate the latch hook 1223 into the second case 121 to realize unlocking, and at the same time, the unlocked door can be directly pulled open by the pulling-out force. Moreover, the transmission rod 17 on the first lock body 11, the cylinder plug seat 15 and the cylinder plug 16 move synchronously with the second lock body 12 by means of the transmission of the linkage 13.

When a key is used to rotate the cylinder plug 16 on the first lock body 11 or the second lock body 12, the cylinder plug 16 drives the transmission rod 17 to rotate, and the transmission rod 17 drives the limiting ring 126 to rotate, such that the limiting rod 1224 on the latch hook 1223 is rotated into the limiting slot 1261 on the limiting ring 126. Afterwards, when the first lock body 11 is pressed or the second lock body 12 is pulled out, the driving plate 123 and the limiting ring 126 press the latch hook 1223 downwards, enabling the latch hook 1223, together with the notched block 1221, to slide to the bottom of the retaining slot 1211 along the retaining slot 1211, such that the latch hook 1223 cannot be rotated to unlock, thereby improving the safety of the lock bodies.

The above embodiments describe the present invention, instead of limiting the present invention, and any solution obtained through simple transformations of the present invention falls within the scope of protection of the present invention.

What is claimed is:

1. A simplified double-sided nylon lock comprising a double-sided lock body (1), which is mounted on a door, and a toggling member (2), which is mounted on a door frame and engaged with the double-sided lock body (1), wherein the double-sided lock body (1) comprises a first lock body (11), which is mounted on a side of a door and is unlocked by means of pressing to open the door, a second lock body (12), which is mounted on the other side of the door and is unlocked by means of pulling-out to open the door, and a linkage (13), which penetrates the door, with one end thereof being connected to the first lock body (11) and the other end thereof being connected to the second lock body (12); and each of the first lock body (11) and the second lock body (12) is provided with a mounting seat (14), which is detachably connected to the door, a cylinder plug seat (15), which is movably connected to the first lock body (11) and the second lock body (12), a cylinder plug (16), which is connected to the cylinder plug seat (15), a transmission rod (17), one end of which is connected to the cylinder plug (16) and the other end of which is connected to the linkage (13), and a spring (18), which is sheathed at the transmission rod (17) to allow the movement of the cylinder plug seat (15).

2. The simplified double-sided nylon lock according to claim 1, wherein the first lock body (11) further comprises a first case (111), which is connected to the mounting seat (14), a sliding slot (112), which is provided on the first case (111), a fixed slider (113), which passes through the transmission rod (17) to be connected to the cylinder plug seat (15) and is slidably connected to the sliding slot (112), and a cover plate (114), one end of which is connected to the first case (111) and the other end of which is connected to the spring (18) to allow the transmission rod (17) to pass through; and a mounting column (1111) for fixing the cover plate (114) is arranged on the first case (111).

3. The simplified double-sided nylon lock according to claim 1, wherein the second lock body (12) comprises a second case (121), which is connected to the mounting seat (14), a retaining slot (1211), which is provided on the second case (121), a strike (122), which is connected to the retaining slot (1211), a driving plate (123), which is mounted within the second case (121), passes through the transmission rod (17) to be connected to the cylinder plug seat (15), and can drive the movement of the strike (122) by means of compressing the spring (18), a baffle plate (124), which is arranged on the second case (121), can pass through the cylinder plug (16) to be connected to the spring (18) at an end, and is connected to the cylinder plug seat (15) at the other end, a circlip (125), which is connected to the transmission rod (17) and located above the driving plate (123), and a limiting ring (126), which is connected to the transmission rod (17) and located below the driving plate (123) for limiting the rotation of a latch hook (1223).

4. The simplified double-sided nylon lock according to claim 3, wherein a limiting slot (1261) for limiting the rotation of the latch hook (1223) is provided on the limiting ring (126) in a circumferential direction.

5. The simplified double-sided nylon lock according to claim 3, wherein the strike (122) comprises a notched block (1221), which fits the retaining slot (1211), a rotation shaft (1222), which is arranged on the notched block (1221), and a latch hook (1223), which is arranged on the rotation shaft (1222).

6. The simplified double-sided nylon lock according to claim 5, wherein a limiting rod (1224) is arranged at an end of the latch hook (1223).

7. The simplified double-sided nylon lock according to claim 1, wherein an end of the transmission rod (17) is provided with a first slot (171), which fits the cylinder plug (16), and the other end thereof is provided with a second slot (172), which fits the linkage (13).

8. The simplified double-sided nylon lock according to claim 2, wherein the first case (111) and the second case (121) are each provided with a guide slot (19), which is connected to the mounting seat (14), and a mounting hole (20), which is used for the fixation to the mounting seat (14).

9. The simplified double-sided nylon lock according to claim 3, wherein the toggling member (2) is provided with a fixing seat (21), which is connected to the door frame, and a latch bolt (22), which is connected to the latch hook (1223).

10. The simplified double-sided nylon lock according to claim 9, wherein both the mounting seat (14) and the fixing seat (21) are also provided with several mounting holes (20) for connecting to the door, the first case (111) and the second case (121).

* * * * *